US011866268B2

United States Patent
Nishimura et al.

(10) Patent No.: US 11,866,268 B2
(45) Date of Patent: Jan. 9, 2024

(54) ARTICLE CONVEYANCE DEVICE AND COMBINATION WEIGHING DEVICE

(71) Applicant: ISHIDA CO., LTD., Kyoto (JP)

(72) Inventors: Ryoji Nishimura, Ritto (JP); Mikio Kishikawa, Ritto (JP); Shigetoshi Hatta, Ritto (JP); Michihiko Yonetsu, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 0 days.

(21) Appl. No.: 17/669,879

(22) Filed: Feb. 11, 2022

(65) Prior Publication Data
US 2022/0289494 A1 Sep. 15, 2022

(30) Foreign Application Priority Data

Mar. 12, 2021 (JP) ................................. 2021-040787

(51) Int. Cl.
*B65G 43/08* (2006.01)
*B65G 27/32* (2006.01)
(Continued)

(52) U.S. Cl.
CPC ............ *B65G 43/08* (2013.01); *B65G 27/32* (2013.01); *B65G 33/02* (2013.01); *G01G 19/393* (2013.01)

(58) Field of Classification Search
CPC ........ B65G 43/08; B65G 27/32; B65G 33/02; B65G 47/19; G01G 19/393; G01G 19/387;
(Continued)

(56) References Cited

U.S. PATENT DOCUMENTS 3,108,647 A * 10/1963 Harmon ................. G01G 13/00
177/121
5,270,495 A * 12/1993 Mosher ................ G01G 19/393
177/25.18
(Continued)

FOREIGN PATENT DOCUMENTS

JP 2009-174912 A 8/2009
JP 2010-122041 A 6/2010
(Continued)

OTHER PUBLICATIONS

The extended European search report issued by the European Patent Office dated Jul. 8, 2022, which corresponds to European Application No. 22156514.6-1001 and is related to U.S. Appl. No. 17/669,879.

*Primary Examiner* — Gregory W Adams
(74) *Attorney, Agent, or Firm* — Studebaker & Brackett PC

(57) ABSTRACT

Problem To improve the efficiency of a combination weighing operation.
An article conveyance device 110 includes an article discharge container 10, an article conveyance mechanism 30, an article detection mechanism 60, and a control unit 90. The container 10 has outlets 20 to discharge articles A. The article conveyance mechanism 30 has feeders 40 including a first feeder 41 to an n-th feeder 4n configured to convey the articles A. The article detection mechanism 60 has sensors 70 including a first sensor 71 to an n-th sensor 7n configured to detect the articles A in the first feeder 41 to the n-th feeder 4n, respectively. The control unit 90 judges whether jamming of the articles A is occurring in the outlets 20 based on output of the article detection mechanism 60. The control unit 90 increases a conveyance intensity of some feeders receiving the articles A from places where the jamming is occurring in the outlets 20.

8 Claims, 7 Drawing Sheets

(51) Int. Cl.
*B65G 33/02* (2006.01)
*G01G 19/393* (2006.01)

(58) Field of Classification Search
CPC ........ G01G 13/24; G01G 11/08; G01G 13/00; G01G 13/026
See application file for complete search history.

(56) References Cited

U.S. PATENT DOCUMENTS

| | | | |
|---|---|---|---|
| 6,373,001 B1 * | 4/2002 | Kono | G01G 23/14 73/1.13 |
| 9,726,533 B2 * | 8/2017 | Kawanishi | G01G 11/086 |
| 2021/0381878 A1 * | 12/2021 | Yokoyama | G01G 19/387 |

FOREIGN PATENT DOCUMENTS

| WO | WO-2004042335 A1 * | 5/2004 | ........... G01G 19/393 |
|---|---|---|---|
| WO | WO-2020122051 A1 * | 6/2020 | ........... G01G 19/387 |

* cited by examiner

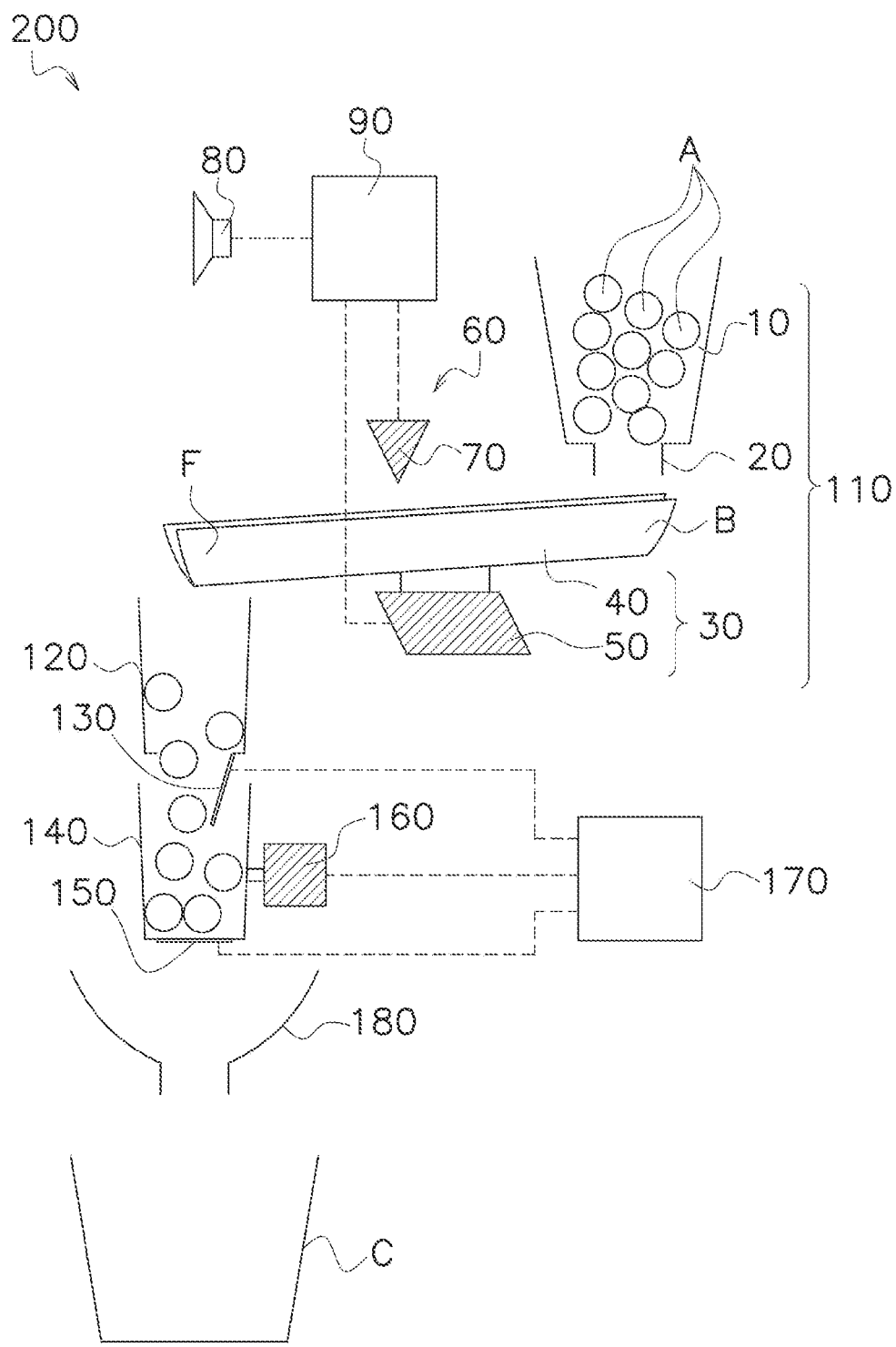
F I G. 2

ARTICLE CONVEYANCE DEVICE AND COMBINATION WEIGHING DEVICE

TECHNICAL FIELD

The present invention relates to an article conveyance device and a combination weighing device using the article conveyance device.

BACKGROUND ART

Patent document 1 (Japanese Laid-open Patent Publication No. 2009-174912) discloses a combination weighing device. The combination weighing device portions out articles, such as granular material, of a predetermined target weight. A packaging device disposed downstream of the combination weighing device finishes products by packaging the articles with the predetermined target weight.

The combination weighing device has an article conveyance device, plural weighing devices, and an arithmetic unit. The article conveyance device serves to pick out articles that have been divided into plural small portions from articles that have been grouped together. The article conveyance device has one article discharge container, which has at least one discharge outlet, and plural feeders. The plural weighing devices weigh each of the small portions. The arithmetic unit finds a combination of the small portions with which the predetermined target weight will be achieved.

SUMMARY OF INVENTION

Technical Problem

Sometimes jamming of the articles may occur in the discharge outlets of the article discharge container. In this case, at least some of the plural feeders become unusable. Thus, the operation for portioning out the predetermined target weight's worth of the articles might not be performed appropriately.

It is an object of the present invention to improve the efficiency of a combination weighing operation in a combination weighing device.

Solution to Problem

An article conveyance device pertaining to a first aspect includes an article discharge container, an article conveyance mechanism, an article detection mechanism, and a control unit. The article discharge container has discharge outlets and is configured to discharge articles from the discharge outlets. The articles are held by the article discharge container. The article conveyance mechanism has plural feeders configured to convey the articles that the plural feeders have received from the discharge outlets. The plural feeders includes a first feeder to an n-th feeder. The article detection mechanism has plural sensors. The plural sensors includes a first sensor to an n-th sensor. The first sensor to the n-th sensor detect presence of the articles in the first feeder to the n-th feeder, respectively. The control unit is configured to judge whether or not jamming of the articles is occurring in the discharge outlets based on output of the article detection mechanism. The control unit is configured to increase a conveyance intensity of some feeders for receiving the articles from places where the jamming is occurring in the discharge outlets.

According to this configuration, the conveyance intensity of the some feeders corresponding to the places where the jamming is occurring is increased. This process makes it easier for jamming in the discharge outlets to be eliminated.

An article conveyance device pertaining to a second aspect is the article conveyance device pertaining to the first aspect, wherein the jamming is a phenomenon where some of the articles get caught on each other in the discharge outlets.

An article conveyance device pertaining to a third aspect is the article conveyance device pertaining to the first aspect or the second aspect, wherein in a case where the article detection mechanism detects that the articles are not being detected during conveyance in just some feeders of the plural feeders and that the articles are being detected during conveyance in the remaining feeders and the control unit judges that the articles are present in the article discharge container, the control unit judges that the jamming is occurring in the discharge outlets that discharge the articles to the some feeders in which the articles are not being detected.

According to this configuration, it is determined that jamming is occurring in a case where the articles are not being detected in just some feeders of the plural feeders. Consequently, a situation where the occurrence of jamming is erroneously detected due to there being none of the articles present in the article discharge container can be avoided.

An article conveyance device pertaining to a fourth aspect is the article conveyance device pertaining to any one of the first aspect to the third aspect, wherein in a case where it has been checked in regard to all natural numbers equal to or greater than 1 and equal to or less than n that a k-th sensor installed in a k-th feeder has detected the articles in a first period since the k-th feeder started conveyance, the control unit judges that the articles will be present in the article discharge container over a second period.

According to this configuration, the control unit judges that there are articles present in the article discharge container based on the operations of the feeders and the response of the articles. Consequently, the control unit is inhibited from erroneously judging that jamming of the articles is occurring due to there being none of the articles present in the article discharge container.

An article conveyance device pertaining to a fifth aspect is the article conveyance device pertaining to any one of the first aspect to the fourth aspect, wherein the control unit, when increasing the conveyance intensity, executes a first process that temporarily increases the conveyance intensity and a second process that reduces the conveyance intensity to its original state.

According to this configuration, the conveyance intensity of the feeders in which the jamming is occurring is temporarily increased and then returns to its original state. Consequently, the conveyance intensity of the feeders in which the jamming is occurring is kept from permanently remaining in a high state, so the conveyance amount per unit of time of the articles is kept close to the initial design value.

An article conveyance device pertaining to a sixth aspect is the article conveyance device pertaining to the fifth aspect, wherein the control unit, when increasing the conveyance intensity, alternates between the first process and the second process.

According to this configuration, the conveyance intensity of the feeders in which jamming is occurring changes periodically. Consequently, the jamming is easily eliminated.

An article conveyance device pertaining to a seventh aspect is the article conveyance device pertaining to any one of the first aspect to the fifth aspect, further includes a notification device that notifies a user that there are none of the articles present in the article discharge container in a case where the article detection mechanism does not detect the articles in any of the plural feeders.

According to this configuration, the user is notified that there are none of the articles present in the article discharge container. Consequently, the user can restock the article discharge container with the articles.

An article conveyance device pertaining to an eighth aspect is the article conveyance device pertaining to any one of the first aspect to the seventh aspect, wherein the article conveyance mechanism further has plural vibrating devices that convey the articles by vibrating each of the plural feeders. The conveyance intensity is the amplitude of vibration of the feeders.

According to this configuration, each of the plural feeders conveys the articles by vibration. Consequently, articles comprising numerous granules can be precisely conveyed.

An article conveyance device pertaining to a ninth aspect is the article conveyance device pertaining to any one of the first aspect to the seventh aspect, wherein the plural feeders each have a guide that guides the articles and a screw that rotates to thereby convey the articles along the guide. The conveyance intensity is the rotational speed of the screws.

According to this configuration, each of the plural feeders conveys the articles using the screws. Consequently, slurry-like articles can be efficiently conveyed.

A combination weighing device pertaining to a tenth aspect includes an article conveyance device, plural hoppers, plural weighing devices, an arithmetic unit, and a chute. The article conveyance device is the article conveyance device pertaining to any one of the first aspect to the ninth aspect. The plural hoppers store the articles they have received from the plural feeders, respectively. The plural weighing devices measure weights of the articles held in each of the plural hoppers. The arithmetic unit selects a combination of some of the plural hoppers so that the total weight of the articles held in the some comes close to a target weight. The chute collects the articles from the some of the plural hoppers.

According to this configuration, jamming can be inhibited from occurring in the discharge outlets of the article discharge container in the article conveyance device installed in the combination weighing device. Consequently, an appropriate combination operation of the combination weighing device is unlikely to be obstructed.

Advantageous Effects of Invention

According to the article conveyance device and the combination weighing device pertaining to the present invention, it becomes easier for jamming of articles to be eliminated and thus the efficiency of the combination weighing operation improves.

BRIEF DESCRIPTION OF DRAWINGS

FIG. 2 is a schematic diagram showing the configuration of the combination weighing device 200 pertaining to the first embodiment;

DESCRIPTION OF EMBODIMENTS

Embodiments of the present invention will be described below with reference to the drawings. It will be noted that the following embodiments are specific examples of the invention and are not intended to limit the technical scope of the invention.

First Embodiment (1) Overall Configuration

Figure 1:
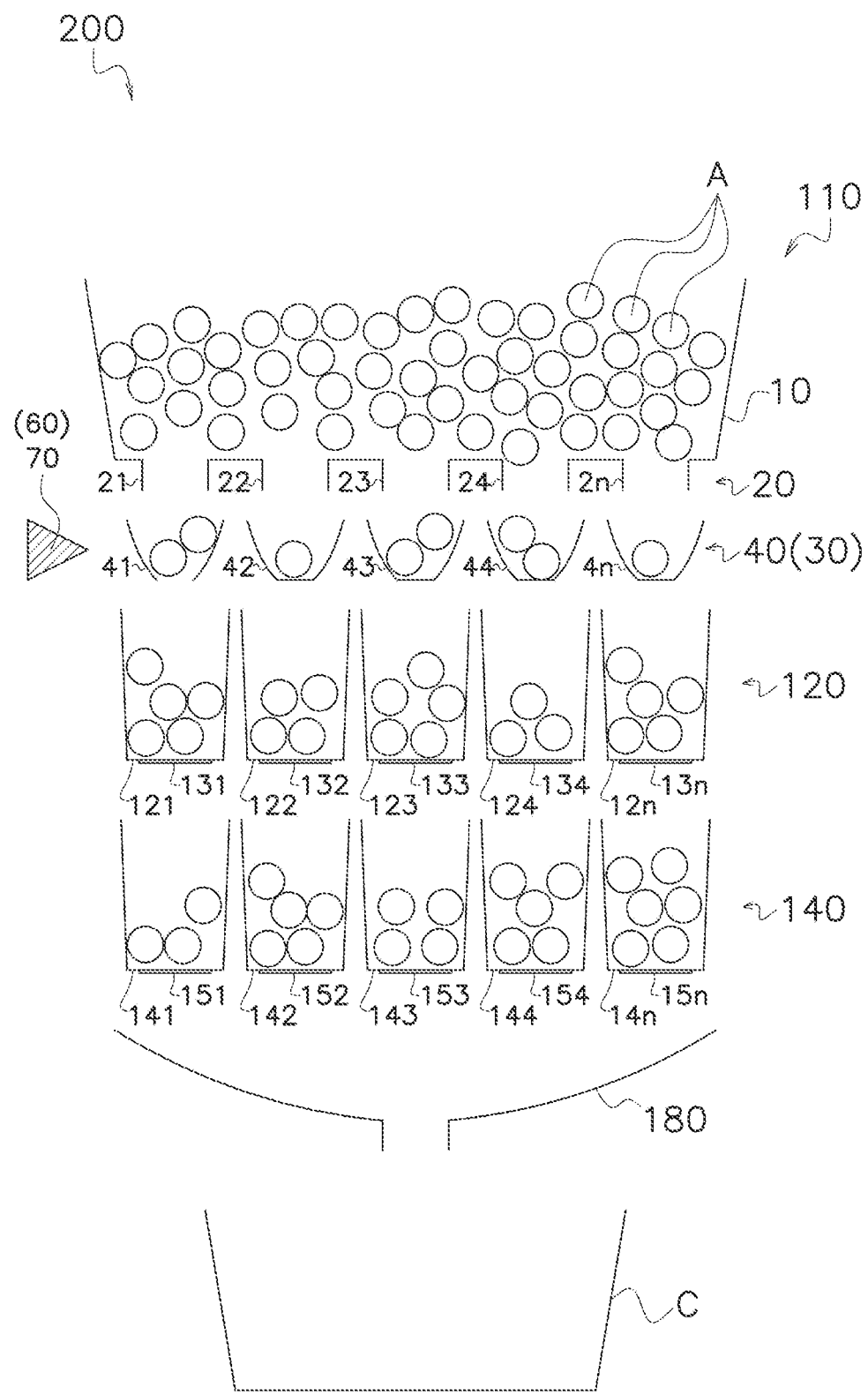
FIG. 1 is a schematic diagram showing the configuration of a combination weighing device 200 pertaining to a first embodiment.

FIG. 1 schematically shows a combination weighing device 200 pertaining to a first embodiment. The combination weighing device 200 portions out articles A, such as granular material, of a predetermined target weight. The combination weighing device 200 includes an article conveyance device 110, plural pool hoppers 120, plural weighing hoppers 140, an arithmetic unit 170 shown in FIG. 2, and a chute 180.

(2) Detailed Configuration (2-1) Article Conveyance Device 110

The article conveyance device 110 shown in FIG. 1 serves to pick out the articles A that have been divided into plural small portions from the articles A that have been grouped together. The article conveyance device 110 has channels of a channel number n. The channel number n is a natural number equal to or greater than 2. The article conveyance device 110 divides small quantities of the articles A into as many small portions as the channel number n.

The article conveyance device 110 has an article discharge container 10, an article conveyance mechanism 30, an article detection mechanism 60, a notification device 80, and a control unit 90.

(2-1-1) Article Discharge Container 10

The article discharge container 10 has plural discharge outlets 20. The plural discharge outlets 20 includes a first discharge outlet 21 to an n-th discharge outlet 2$n$. The number of the discharge outlets 20 is equal to the channel number n. The articles A that the article discharge container 10 holds can be discharged from each of the plural discharge outlets 20.

(2-1-2) Article Conveyance Mechanism 30

The article conveyance mechanism 30 serves to convey the small quantities of the articles A. As shown in FIG. 2, the article conveyance mechanism 30 has plural feeders 40 and plural vibrating devices 50.

As shown in FIG. 1, the plural feeders 40 include a first feeder 41 to an n-th feeder 4$n$. The number of the feeders 40 is equal to the channel number n. Each of the plural feeders 40 receives the articles A from a corresponding one of the plural discharge outlets 20.

The plural vibrating devices 50 shown collectively in FIG. 2 include a first vibrating device 51 to an n-th vibrating device 5$n$. The number of the vibrating devices 50 is equal to the channel number n. The first vibrating device 51 to the n-th vibrating device 5$n$ are mounted on the first feeder 41 to the n-th feeder 4$n$, respectively. Each of the plural vibrating devices 50 applies vibration to a corresponding one of the plural feeders 40 to thereby convey the articles A placed in that one feeder 40 form the first end B toward the second end F. The plural feeders 40 can each individually generate and stop the vibration.

(2-1-3) Article Detection Mechanism 60

The article detection mechanism 60 has plural sensors 70 shown collectively in FIG. 2. The plural sensors 70 include a first sensor 71 to an n-th sensor 7$n$. The number of the sensors 70 is equal to the channel number n. The first sensor 71 to the n-th sensor 7$n$ are installed in the first feeder 41 to the n-th feeder 4$n$, respectively. The first sensor 71 to the n-th sensor 7$n$ detect the presence of the articles A on the first feeder 41 to the n-th feeder 4$n$, respectively.

(2-1-4) Notification Device 80

The notification device 80 notifies a user of messages. The specific configuration of the notification device 80 is not limited and may be, for example, a speaker, a buzzer, a display, or a lamp.

(2-1-5) Control Unit 90

The control unit 90 manages the operations of each part of the article conveyance device 110. For example, the control unit 90 starts and stops the vibration generation operation executed by the plural vibrating devices 50. In addition, the control unit 90 adjusts the amplitude of vibration that each of the vibrating devices 50 generates. The control unit 90 can, by increasing the amplitude of vibration of one of the vibrating devices 50, increase the conveyance intensity of the corresponding feeder 40. The control unit 90 can, by reducing the amplitude of vibration of one of the vibrating devices 50, reduce the conveyance intensity of the corresponding feeder 40.

Moreover, the control unit 90 grasps whether or not the articles A are present in predetermined positions in the plural feeders 40 based on outputs of the plural sensors 70 it has received.

Moreover, the control unit 90 controls the notification device 80.

(2-2) Plural Pool Hoppers 120

The plural pool hoppers 120 shown in FIG. 1 include a first pool hopper 121 to an n-th pool hopper 12$n$. The number of the pool hoppers 120 is equal to the channel number n. The first pool hopper 121 to the n-th pool hopper 12$n$ receive the articles A from the first feeder 41 to the n-th feeder 4$n$, respectively, and hold the articles A.

The plural pool hoppers 120 are provided with plural pool hopper gates 130. The number of the pool hopper gates 130 is equal to the channel number n. The first pool hopper 121 to the n-th pool hopper 12$n$ are provided with a first pool hopper gate 131 to an n-th pool hopper gate 13$n$, respectively. Each of the plural pool hoppers 120 continues to hold the articles A when its own pool hopper gate 130 is closed. Furthermore, each of the plural pool hoppers 120 discharges the articles A when its own pool hopper gate 130 opens.

(2-3) Plural Weighing Hoppers 140

The plural weighing hoppers 140 shown in FIG. 1 include a first weighing hopper 141 to an n-th weighing hopper 14$n$. The number of the weighing hoppers 140 is equal to the channel number n. The first weighing hopper 141 to the n-th weighing hopper 14$n$ receive the articles A from the first pool hopper 121 to the n-th pool hopper 12$n$, respectively, and hold the articles A.

The plural weighing hoppers 140 are provided with plural weighing hopper gates 150. The plural weighing hopper gates 150 include a first weighing hopper gate 151 to an n-th weighing hopper gate 15$n$. The number of the weighing hopper gates 150 is equal to the channel number n. The first weighing hopper 141 to the n-th weighing hopper 14$n$ are provided with the first weighing hopper gate 151 to an n-th weighing hopper gate 15$n$, respectively. Each of the plural weighing hoppers 140 continues to hold the articles A when its own weighing hopper gate 150 is closed. Furthermore, each of the plural weighing hoppers 140 discharges the articles A when its own weighing hopper gate 150 opens.

The plural weighing hoppers 140 are also provided with plural weighing devices 160 shown in FIG. 2. The plural weighing devices 160 shown collectively in FIG. 2 include a first weighing device 161 to an n-th weighing device 16$n$. The number of the weighing devices 160 is equal to the channel number n. The first weighing hopper 141 to the n-th weighing hopper 14$n$ are provided with the first weighing device 161 to the n-th weighing device 16$n$, respectively. Each of the plural weighing devices 160 measures the weight of the articles A being held in the corresponding weighing hopper 140. The articles A being held in the plural weighing hoppers 140 are those that have been divided into small portions by the article conveyance device 110.

(2-4) Arithmetic Unit 170

The arithmetic unit 170 shown in FIG. 2 serves to find a combination of the small portions with which a predetermined target weight will be achieved.

The arithmetic unit 170 can receive information relating to the weights of the articles A held in the first weighing hopper 141 to the n-th weighing hopper 14$n$ from the plural weighing devices 160. Moreover, the arithmetic unit 170 can individually open and close the plural pool hopper gates 130 and the plural weighing hopper gates 150.

The arithmetic unit 170 selects, based on the information relating to the weights of the articles A held in the plural weighing hoppers 140, some of the first weighing hopper 141 to the n-th weighing hopper 14$n$ so that the total weight of the articles A held in the selected weighing hoppers comes closest to the target weight. Next, the arithmetic unit 170 opens the weighing hopper gates 150 of the selected ones of the weighing hoppers 140 to thereby discharge the articles A being held in the selected ones of the weighing hoppers 140. In this way, the articles A with the target weight are discharged from the chute 180 to a container C.

The arithmetic unit 170 may exchange information by communicating with the control unit 90. Alternatively, the arithmetic unit 170 may be configured as a computer or a processor integrated with the control unit 90.

(2-5) Chute 180

The chute 180 groups together the articles A discharged from the plural weighing hoppers 140 and delivers them to the container C.

(3) Processes of Article Conveyance Device 110

(3-1) Phenomenon of Jamming

Figure 3:
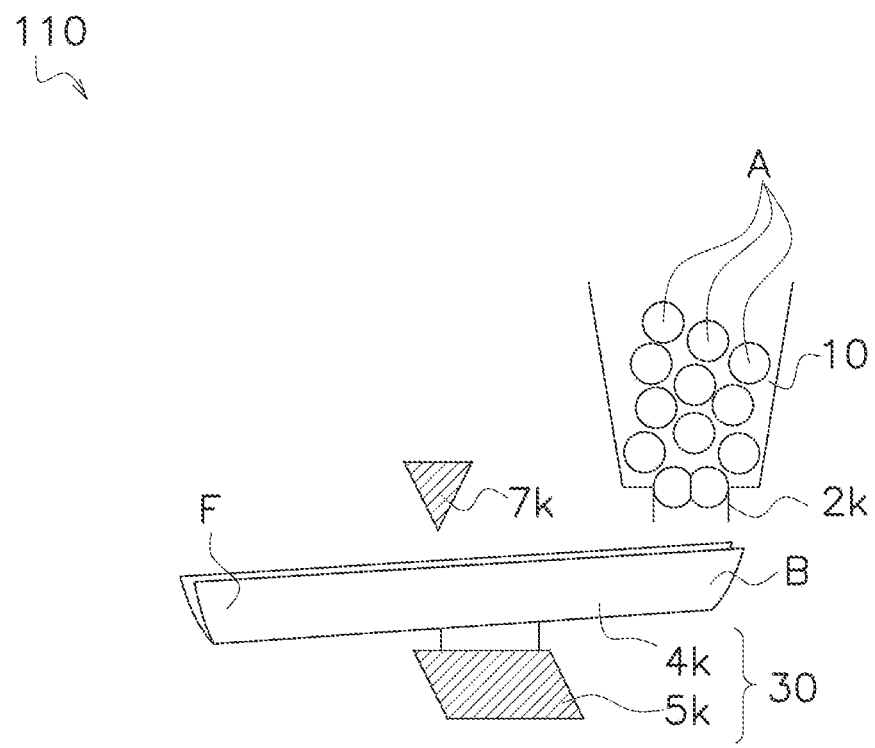
FIG. 3 is a schematic diagram showing the configuration of an article conveyance device 110.

In the article discharge container 10 of the article conveyance device 110, a phenomenon of jamming may occur. FIG. 3 is a schematic diagram for explanation of jamming FIG. 3 shows a k-th channel of the article conveyance device 110.

The articles A discharged from the k-th discharge outlet 2$k$ of the article discharge container 10 are transferred to the k-th feeder 4$k$ of the article conveyance mechanism 30. At this time, depending on the shape or mass of the individual granules constituting the articles A, the shape of the article discharge container 10, temperature or humidity, and other conditions, a phenomenon can occur where the articles A are not discharged from the k-th discharge outlet 2$k$ even though there are articles A present in the article discharge container 10. At this time, some of the articles A get caught on each other at a portion of the conveyance path for the articles A in the k-th channel, typically in the vicinity of the k-th discharge outlet 2k. This is jamming of the articles A occurring in the k-th discharge outlet 2k.

(3-2) Process for Determining Whether or not Articles are Present

Figure 4:
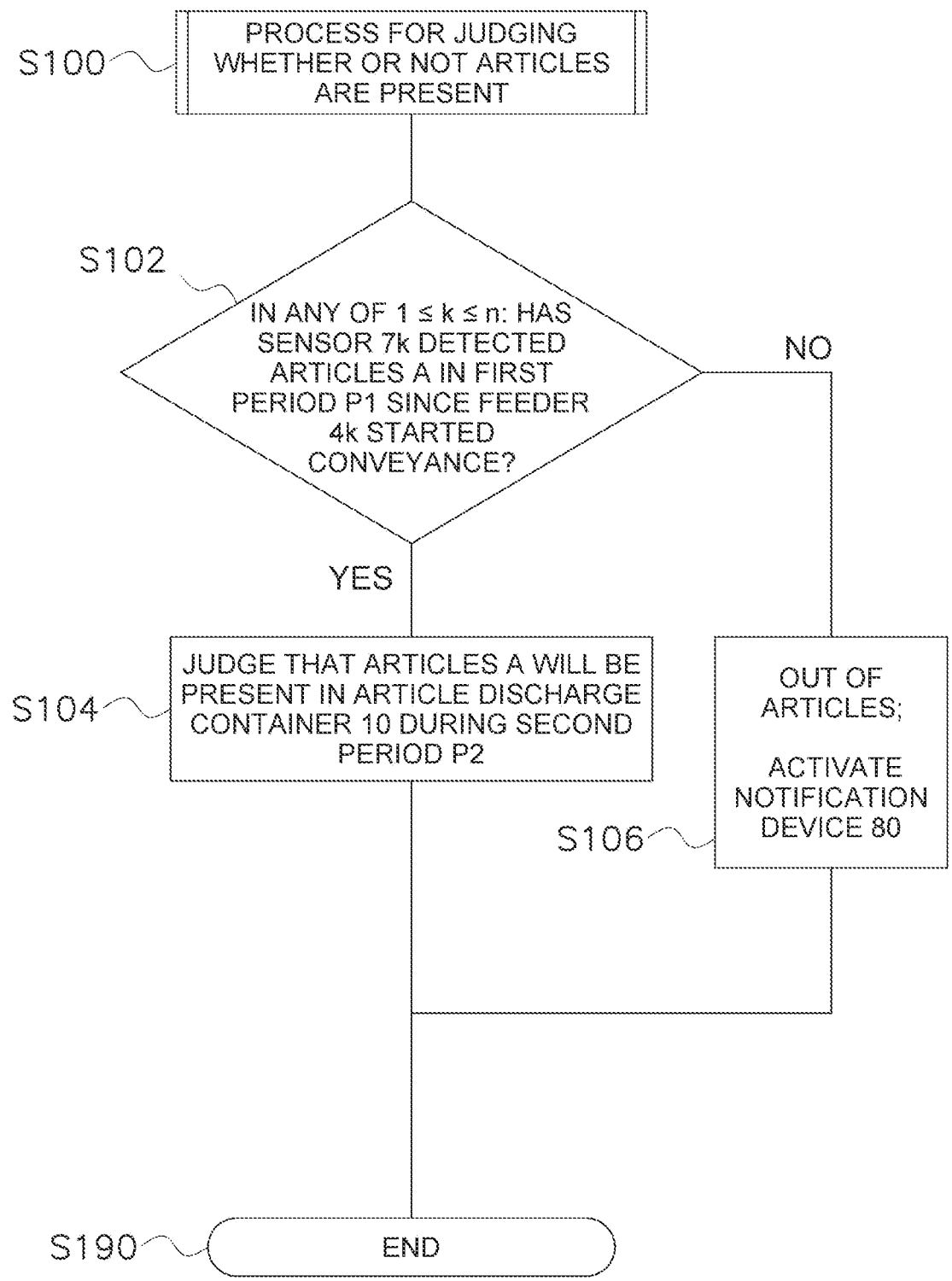
FIG. 4 is a flowchart showing a process for determining whether or not articles A are present.

The article conveyance device 110 does not specially have a dedicated sensor for detecting whether or not articles A are present in the article discharge container 10. The control unit 90 judges whether or not articles A are present in the article discharge container 10 by performing control shown in FIG. 4.

In step S102 the control unit 90 checks, regarding all natural numbers k ($1 \leq k \leq n$) equal to or less than the channel number n, whether or not a k-th sensor 7k installed for a k-th feeder 4k has detected the articles A in a first period P1 since the k-th feeder 4k started conveyance. In a case where the articles A have been detected in any of the plural feeders 40, the process moves to step S104. In a case where the articles A have not been detected in any of the plural feeders 40, the process moves to step S106.

In step S104, the control unit 90 judges that the articles A will be present in the article discharge container 10 over a second period P2.

In step S106, the control unit 90 activates the notification device 80 to notify the user that there are none of the articles A present in the article discharge container 10.

(3-3) Process for Detecting Jamming

Figure 5:
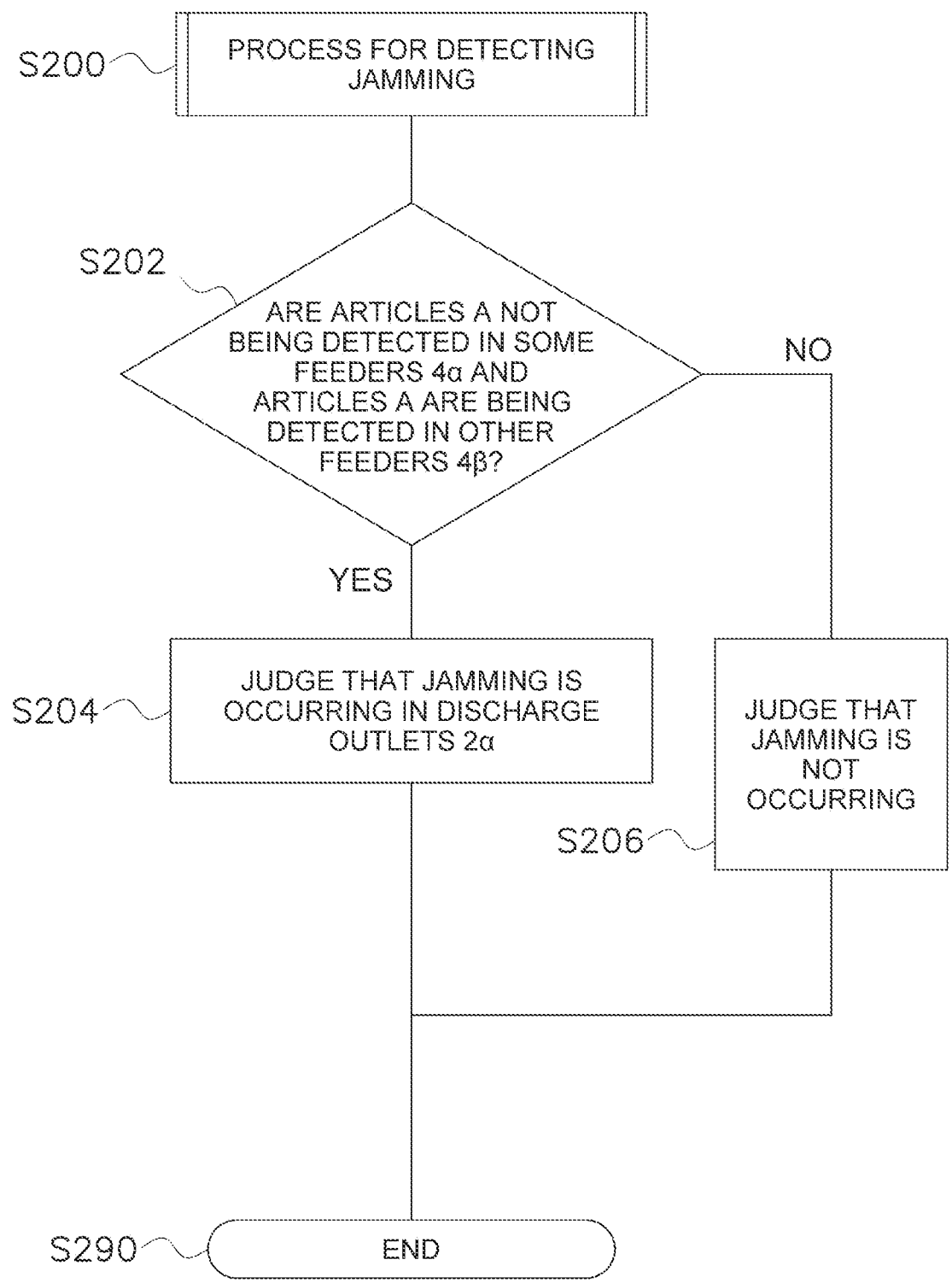
FIG. 5 is a flowchart showing a process for detecting jamming.

FIG. 5 is a flowchart of a process for detecting jamming.

In step S202 the article detection mechanism 60 detects that, in just some feeders 4α of the plural feeders 40, the articles A are not being detected during conveyance by the some feeders 4α and that, in the remaining feeders 4β, the articles A are being detected during conveyance by the remaining feeders 4β. In this case, the process moves to step S204. When this is not the case, the process moves to step S206.

In step S204 the control unit 90 judges that jamming is occurring in the discharge outlets 2α corresponding to the feeders 4α.

In step S206 the control unit 90 judges that jamming is not occurring.

(3-4) Process for Eliminating Jamming

Figure 6:
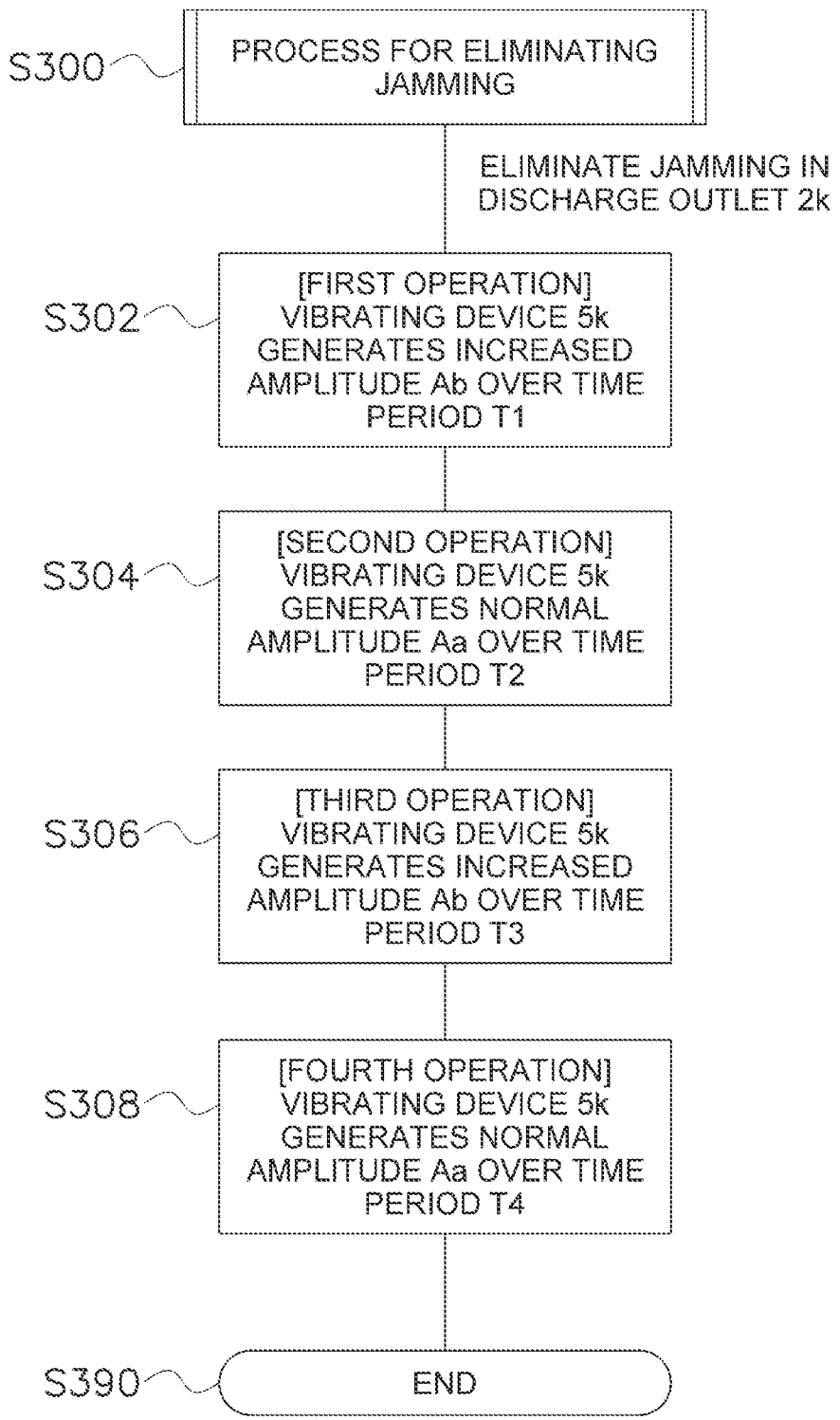
FIG. 6 is a flowchart showing a process for eliminating jamming.

FIG. 6 is a flowchart of a process for eliminating jamming.

In normal circumstances where jamming is not occurring in any of the first discharge outlet 21 to the n-th discharge outlet 2n, the plural vibrating devices 50 apply vibration with a normal amplitude Aa to the corresponding feeders 40.

The control unit 90 judges that jamming of the articles A is occurring in the k-th discharge outlet 2k belonging to the k-th channel. In this case, the following series of operations is performed to eliminate the jamming.

[First Operation] First, in step S302 the k-th vibrating device 5k applies vibration with an increased amplitude Ab to the k-th feeder 4k over a time period T1. The increased amplitude Ab is greater than the normal amplitude Aa. The time period T1 is, for example, 500 ms.

[Second Operation] Next, in step S304 the k-th vibrating device 5k applies vibration with the normal amplitude Aa to the k-th feeder 4k over a time period T2. The time period T2 is, for example, 500 ms.

[Third Operation] In step S306 the k-th vibrating device 5k again applies vibration with the increased amplitude Ab to the k-th feeder 4k over a time period T3. The time period T3 is, for example, 500 ms.

[Fourth Operation] Next, in step S308 the k-th vibrating device 5k applies vibration with the normal amplitude Aa to the k-th feeder 4k over a time period T4. The time period T4 is, for example, 500 ms.

In this way, when the vibration with the increased amplitude Ab is applied to the feeder receiving the articles from the discharge outlet in which the jamming is occurring, sometimes the vibration travels to the place where the jamming is occurring via the series of the articles A so that the jamming is eliminated.

In a case where the control unit 90 judges that the jamming has been eliminated during the above series of operations, the control unit 90 may suspend the series of operations.

(4) Characteristics (4-1)

The conveyance intensity of the some feeders corresponding to the places where the jamming is occurring is increased. This process makes it easier for jamming in the discharge outlet 20 to be eliminated.

(4-2)

The control unit 90 judges that jamming is occurring in a case where the articles A are not being detected in just some feeders of the plural feeders 40. Consequently, a situation where the occurrence of jamming is erroneously detected due to there being none of the articles A present in the article discharge container 10 can be avoided.

(4-3)

The control unit 90 judges that there are articles A present in the article discharge container 10 based on the operations of the feeders 40 and the response of the articles A. Consequently, the control unit 90 is inhibited from erroneously judging that jamming of the articles A is occurring due to there being none of the articles A present in the article discharge container 10.

(4-4)

The conveyance intensity of the feeders 40 in which the jamming is occurring is temporarily increased and then returns to its original state. Consequently, the conveyance intensity of the feeders 40 in which the jamming is occurring is kept from permanently remaining in a high state, so the conveyance amount per unit of time of the articles A is kept close to the initial design value.

(4-5)

The conveyance intensity of the feeders 40 in which the jamming is occurring changes periodically. Consequently, the jamming is easily eliminated.

(4-6)

The user is notified that there are none of the articles A present in the article discharge container 10. Consequently, the user can restock the article discharge container 10 with the articles A.

(4-7)

Each of the plural feeders 40 conveys the articles A by vibration. Consequently, articles comprising numerous granules can be precisely conveyed.

Second Embodiment (1) Configuration

Figure 7:
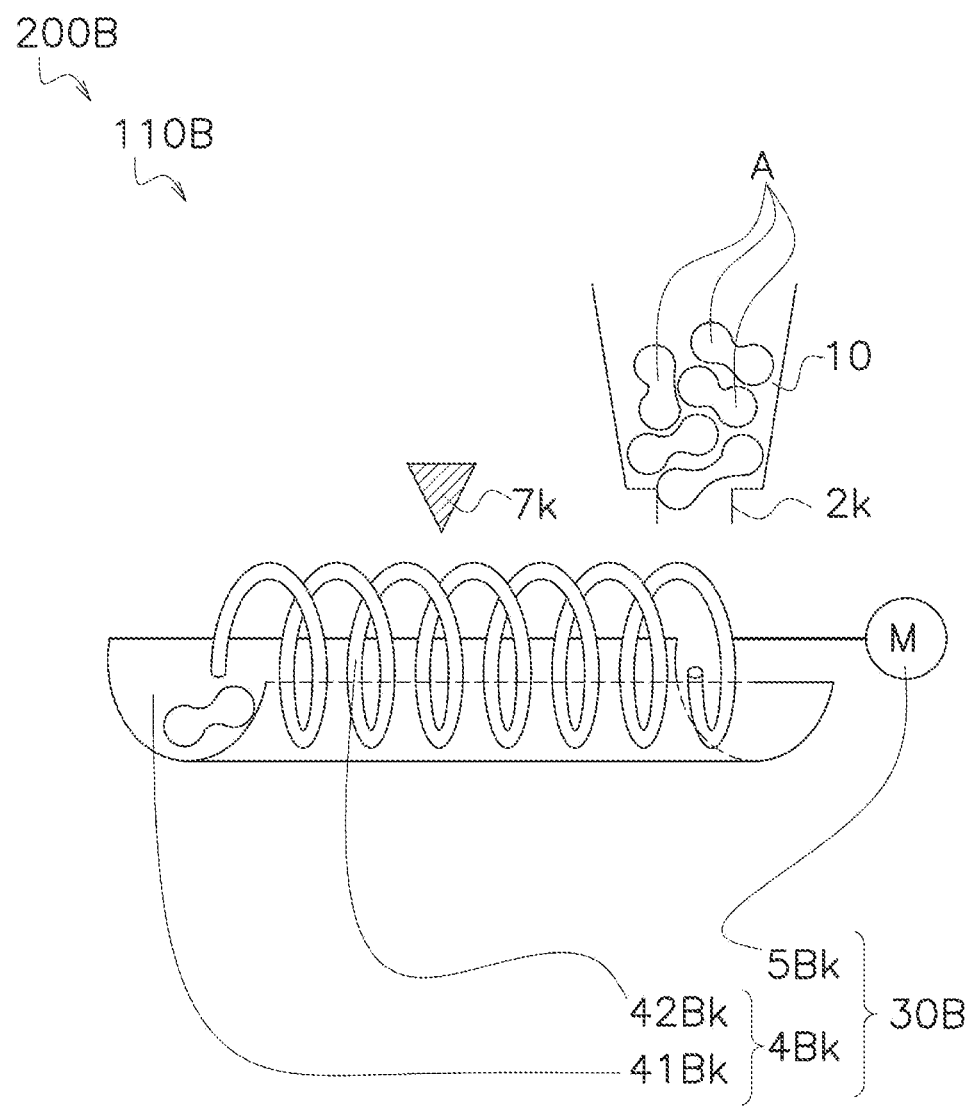
FIG. 7 is a schematic diagram showing the configuration of an article conveyance device 110B installed in a combination weighing device 200B pertaining to a second embodiment.

FIG. 7 is a schematic diagram showing the configuration of an article conveyance device 110B installed in a combination weighing device 200B pertaining to a second embodiment. The article conveyance device 110B is suited for conveying moist articles A such as chicken meat or slurry-like articles A.

The article conveyance device 110B has an article conveyance mechanism 30B. The article conveyance mechanism 30B has plural feeders 4B and plural motors 5B. Each of the plural feeders 4B has a guide 41B and a screw 42B.

In order for the k-th feeder 4Bk to convey the articles A, the k-th motor 5Bk is activated to rotate the k-th screw 42Bk. Because of this, the k-th screw 42Bk moves the articles A in one direction. To increase the conveyance intensity of the k-th feeder 4Bk, the rotational speed of the k-th motor 5Bk is increased. Control of the rotational speed is the same as in the first embodiment.

(2) Characteristics

Each of the plural feeders 4B conveys the articles A using the screws 42B. Consequently, slurry-like articles A can be efficiently conveyed.

REFERENCE SIGNS LIST

10: Article Discharge Container
20: Plural Discharge Outlets
21: First Discharge Outlet
2n: n-th Discharge Outlet
30, 30B: Article Conveyance Mechanisms
40: Plural Feeders
41: First Feeder
4n: n-th Feeder
50: Plural Vibrating Devices
51: First Vibrating Device
5n: n-th Vibrating Device
5B: Plural Motors
5Bk: k-th Motor
60: Article Detection Mechanism
70: Plural Sensors
71: First Sensor
7n: n-th Sensor
80: Notification Device
90: Control Unit
110, 110B: Article Conveyance Devices
120: Plural Pool Hoppers
121: First Pool Hopper
12n: n-th Pool Hopper
130: Plural Pool Hopper Gates
131: First Pool Hopper Gate
13n: n-th Pool Hopper Gate
140: Plural Weighing hoppers
141: First Weighing hopper
14n: n-th Weighing hopper
150: Plural Weighing hopper Gates
151: First Weighing hopper Gate
15n: n-th Weighing hopper Gate
160: Plural Weighing Devices
161: First Weighing Device
16n: n-th Weighing Device
170: Arithmetic Unit
180: Chute
200, 200B: Combination Weighing Devices
A: Articles
Aa: Normal Amplitude
Ab: Increased Amplitude
C: Container
P1: First Period
P2: Second Period
T1 to T4: Time Periods
n: Channel Number

CITATION LIST

Patent Literature

Patent Document 1: Japanese Laid-open Patent Publication No. 2009-174912

The invention claimed is:

1. An article conveyance device comprising:
an article discharge container having discharge outlets and configured to discharge articles from the discharge outlets, the articles being held by the article discharge container;
an article conveyance mechanism having plural feeders configured to convey the articles that the plural feeders have received from the discharge outlets, the plural feeders including a first feeder to an n-th feeder;
an article detection mechanism having plural sensors, the plural sensors including a first sensor to an n-th sensor configured to detect presence of the articles in the first feeder to the n-th feeder, respectively; and
a control unit configured to judge whether or not jamming of the articles is occurring in the discharge outlets based on output of the article detection mechanism and increase a conveyance intensity of some feeders for receiving the articles from places where the jamming is occurring in the discharge outlets, wherein
in a case where the article detection mechanism detects that the articles are not being detected during conveyance in just some feeders of the plural feeders and that the articles are being detected during conveyance in the remaining feeders and the control unit judges that the articles are present in the article discharge container, the control unit judges that the jamming is occurring in the discharge outlets that discharge the articles to the some feeders in which the articles are not being detected, and
in a case where it has been checked in regard to all natural numbers equal to or greater than 1 and equal to or less than n that a k-th sensor installed in a k-th feeder has detected the articles in a first period since the k-th feeder started conveyance, the control unit judges that the articles will be present in the article discharge container over a second period.

2. The article conveyance device of claim 1, wherein the jamming is a phenomenon where some of the articles get caught on each other in the discharge outlets.

3. The article conveyance device of claim 1, wherein the control unit, when increasing the conveyance intensity, executes a first process that temporarily increases the conveyance intensity and a second process that reduces the conveyance intensity to its original state.

4. The article conveyance device of claim 3, wherein the control unit, when increasing the conveyance intensity, alternates between the first process and the second process.

5. The article conveyance device of claim 1, further comprising a notification device that notifies a user that there are none of the articles present in the article discharge container in a case where the article detection mechanism does not detect the articles in any of the plural feeders.

6. The article conveyance device of claim 1, wherein
the article conveyance mechanism further has plural vibrating devices that convey the articles by vibrating each of the plural feeders, and
the conveyance intensity is an amplitude of vibration of the feeders.

7. An article conveyance device comprising:
an article discharge container having discharge outlets and configured to discharge articles from the discharge outlets, the articles being held by an article discharge container;
an article conveyance mechanism having plural feeders configured to convey the articles that the plural feeders have received from the discharge outlets, the plural feeders including a first feeder to an n-th feeder;
an article detection mechanism having plural sensors, the plural sensors including a first sensor to an n-th sensor configured to detect presence of the articles in the first feeder to the n-th feeder, respectively; and
a control unit configured to judge whether or not jamming of the articles is occurring in the discharge outlets based on output of the article detection mechanism and increase a conveyance intensity of some feeders for receiving the articles from places where the jamming is occurring in the discharge outlets, wherein
the plural feeders each have a guide that guides the articles and a screw that rotates to thereby convey the articles along the guide, and
the conveyance intensity is a rotational speed of the screws.

8. A combination weighing device comprising:
the article conveyance device of claim 1;
plural hoppers that store the articles they have received from the plural feeders, respectively;
plural weighing devices that measure weights of the articles held in each of the plural hoppers;
an arithmetic unit that selects a combination of some of the plural hoppers so that a total weight of the articles held in the some comes close to a target weight; and
a chute that collects the articles from the some of the plural hoppers.

* * * * *